Oct. 20, 1953 H. R. PUTZ 2,656,472

REMOTE-CONTROL SYSTEM

Filed March 17, 1951 2 Sheets-Sheet 1

INVENTOR.
Hector R. Putz
BY
Arthur R. Woolfolk
Attorney

Oct. 20, 1953 H. R. PUTZ 2,656,472

REMOTE-CONTROL SYSTEM

Filed March 17, 1951 2 Sheets-Sheet 2

INVENTOR.
Hector R. Putz
BY
Arthur R. Woolfolk
Attorney

Patented Oct. 20, 1953

2,656,472

UNITED STATES PATENT OFFICE 2,656,472

REMOTE-CONTROL SYSTEM

Hector Rawcliffe Putz, Toronto, Ontario, Canada, assignor to McGraw Electric Company, Milwaukee, Wis., a corporation of Delaware Application March 17, 1951, Serial No. 216,127

6 Claims. (Cl. 307—140)

This invention relates to a system of remote control of a plurality of different switches.

Systems in which high frequency carrier currents are superimposed on power lines to control remotely located switches have been employed, but these systems require expensive as well as elaborate equipment and are not practical for all installations.

This invention is designed to overcome the above noted defects in remote control systems and objects of this invention are to provide a remote control system which is simple in construction and is relatively inexpensive and which does not require the use of carrier current generating and receiving equipment but, instead makes use of a single pilot wire and simple types of receivers.

Further objects are to provide a system of remote control in which different groups of receivers may be selectively controlled though only a single pilot wire is employed.

In greater detail, further obejcts are to provide a system of remote control in which each receiver is so constructed that it has a cyclic period of operations for opening and closing switch means and in which one group of receivers has a period of operation for a complete cycle which is double or a whole multiple of the period of a complete cycle of operations of another receiver.

An embodiment of the invention is shown in the accompanying drawings, in which.

Figure 1:
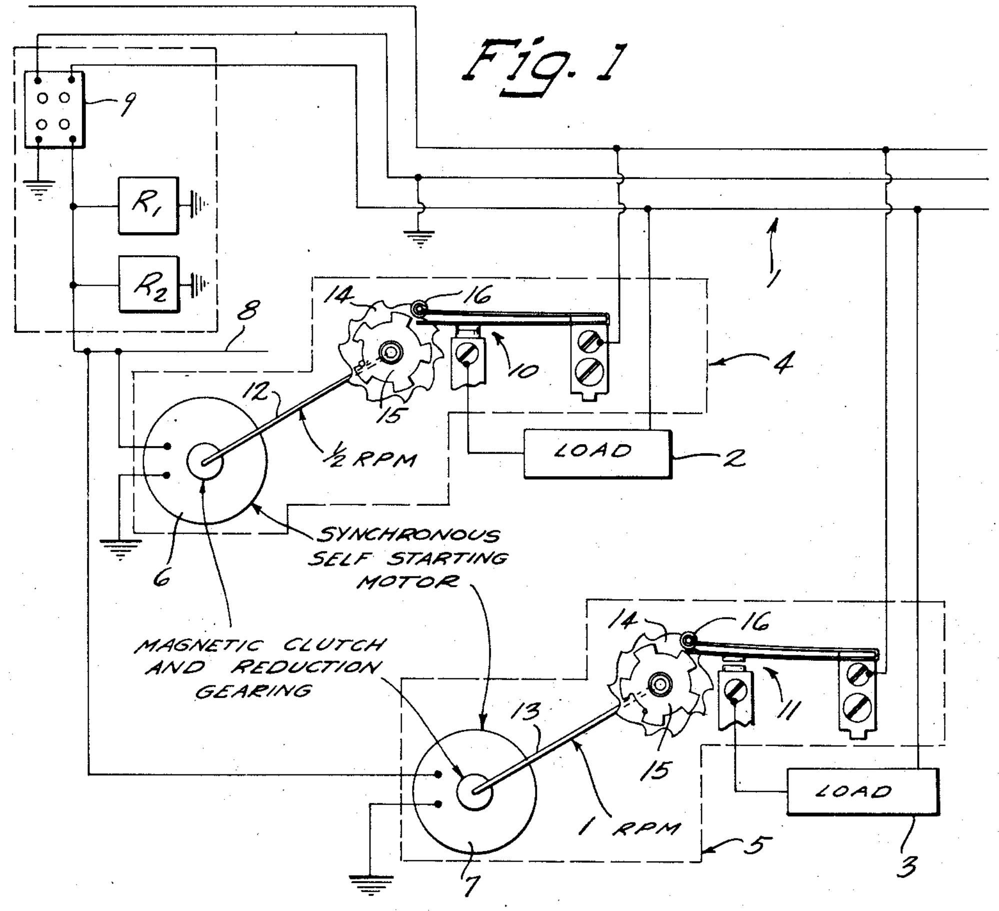
Figure 1 is a schematic view of the apparatus showing it connected to the power line.

Referring to Figure 1, it will be seen that the power lines are indicated generally by the reference character 1 and a first and a second load by the reference characters 2 and 3, respectively. The first receiver is indicated generally by the reference character 4 and the second receiver by the reference character 5. These receivers are provided, in each instance, with a motor indicated by the reference characters 6 and 7, respectively. These motors are connected to a pilot line 8 and the pilot line is supplied from the mains or other source of alternating current by means of a transmitter 9.

The first receiver 4 is provided with switch means indicated generally by the reference character 10 arranged to control the first mentioned load 2 and the second receiver 5 is provided with switch means 11 arranged to control the second load 3. The construction is such that either load may be connected to or disconnected from the power line as will be apparent as the description proceeds.

It is to be understood that any number of receivers identical with the receiver 4 and any number identical with the receiver 5 may be employed and may be connected as shown for the receivers 4 and 5.

The receivers 4 and 5 are identical with the single exception that the motor means 6 of the first receiver 4 rotates its shaft 12 at half the speed that the motor means 7 of the second receiver 5 rotates its shaft 13. For example, in a 60 cycle system the motor means 6 may rotate the shaft ½ R. P. M. and the motor means 7 may rotate its shaft 1 R. P. M.

Each of the motors 6 and 7 is a self-starting synchronous motor and is connected with its respective shaft by means of reduction gearing and a normally open magnetic clutch arranged to close when the respective motor is energized. The shafts 12 and 13 each are provided with identical first and second cams indicated by the reference characters 14 and 15 and with identical cam followers 16 coacting with the cams 14. The cam 14 is provided with a plurality of short and long teeth 17 and 18 which have slanting outer faces extending inwardly towards the center of the shaft as the seating portions 19 of the teeth are approached. These seating portions 19 are adapted to receive the roller or cam follower 16 and to thus determine the zero or initial position for the start of any operation. This is secured by having the cam follower 16 carried by means of a spring arm 20 which presses the cam follower 16 inwardly and causes the cam 14 to return to its initial or zero position in case there is an over-running or overshooting of the clutch slightly past its zero or initial position.

Figures 3, 4, 5:
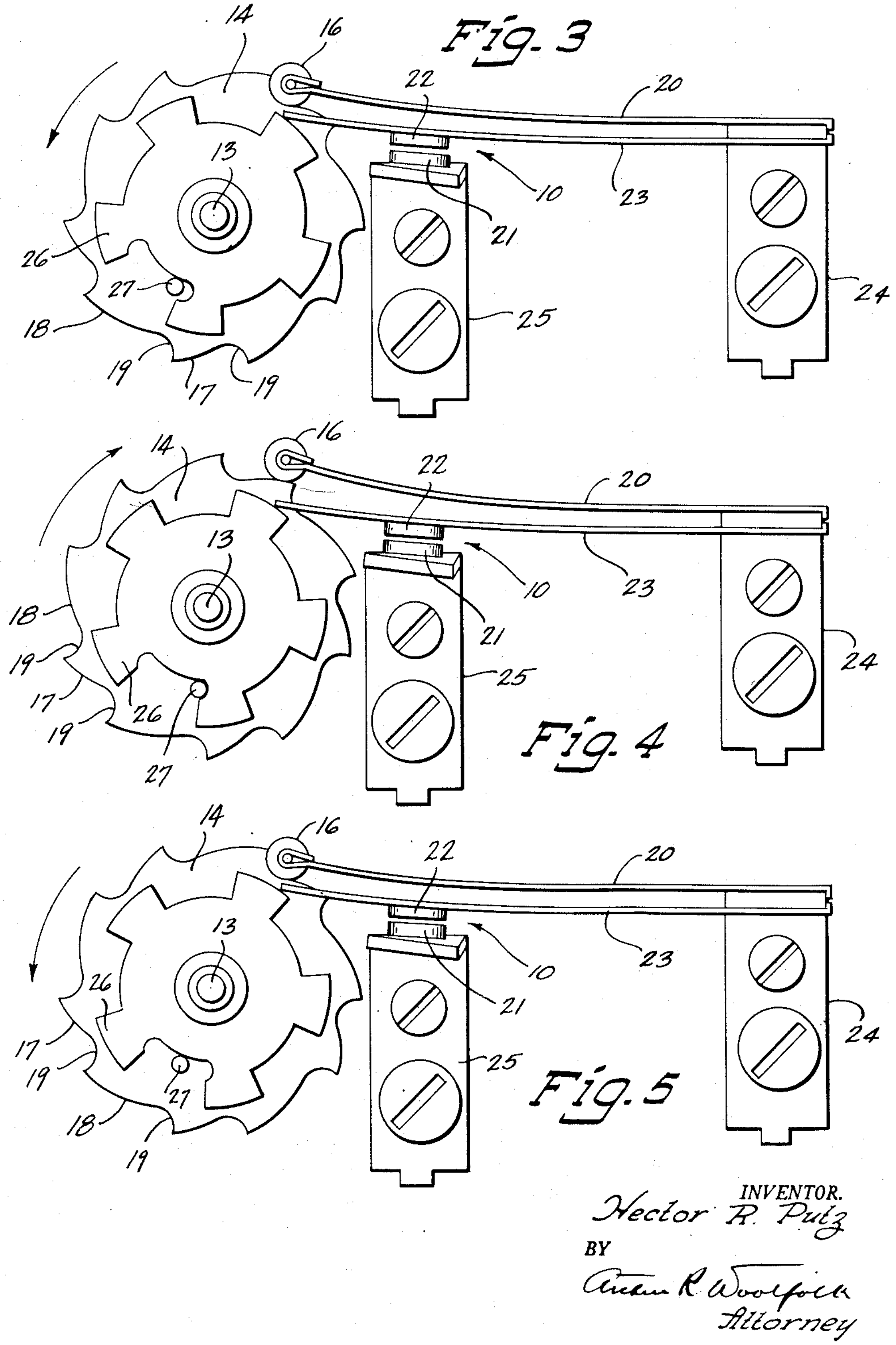
Figure 3 is a corresponding view showing the receiver in the "off" position.
Figure 4 shows the position of the parts when a spurious signal has been received.
Figure 5 shows the position of the parts when the cam moves back to one of its zero or initial positions after cessation of the spurious signal.

The switch means 10 is provided with a stationary contact 21 carried by the terminal 25 and a movable contact 22 carried by a spring arm 23 electrically connected to the terminal 24. The spring arm 23 is actuated by means of a second cam 15. This cam 15 is provided with a plurality of teeth 26, any one of which may be positioned below the spring arm 23 and may thus serve to hold the switch in open position as shown in Figures 3, 4, and 5. The second cam or toothed wheel 15 has motion relative to the first cam 14, the first cam being rigidly connected to the shaft and the second cam being driven from the first cam by means of a pin 27.

It is preferable to form the tooth 17 so that it includes 30° of the cam and the tooth 18 so that it includes 42° of the cam, the two teeth together including a total of 72°. There are five pairs of teeth for the cam 14 and five projecting teeth 26 for the cam 15.

Assuming that a signal or, in other words, energy is transmitted to the pilot line 8, it is apparent that both motors will operate and drive their respective cams, the cams of the first receiver rotating at exactly half the speed of the cams of the second receiver. Considering first the operation of the second receiver alone, it is apparent that if a signal persists for eight seconds with the parts in the position shown in Figure 2, that the cam 14 will be driven slightly past the position shown in Figure 3 and the cam 14 will return to such position with the contact means 10 open.

Figure 2:
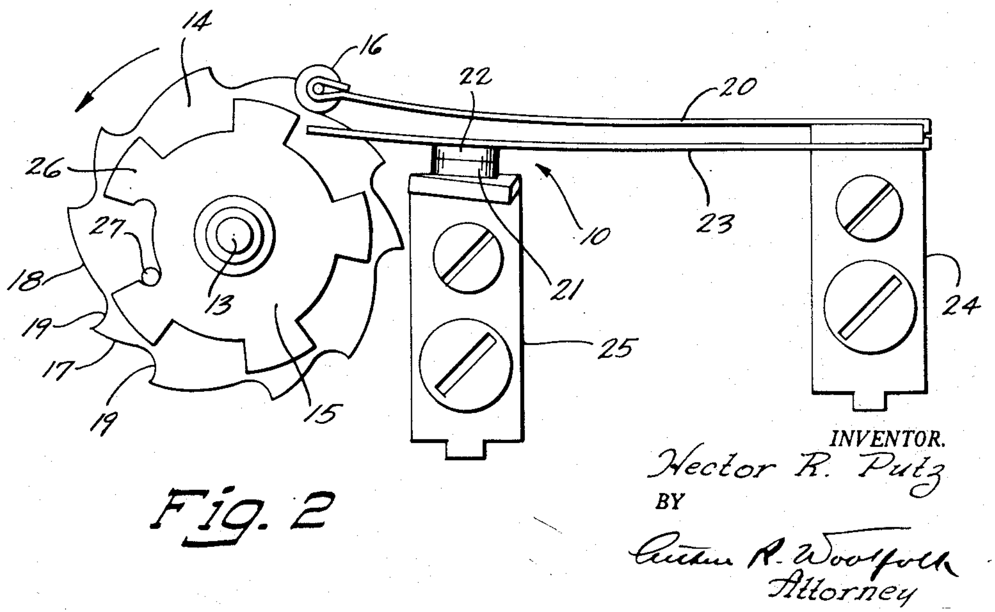
Figure 2 is a view of the cam and associated parts of one of the receivers showing the receiver in the "on" position.

It is to be noted that when the switch or contact means is in the "off" position it may, upon a subsequent signal lasting for six seconds, move the cam to the position shown in Figure 2, thus closing the contacts.

It is to be noted particularly with reference to the first receiver 4 that its cam 14 moves only part of the length of any one of its teeth for either of these signals and returns to its zero or initial position after each signal. Thus the second receiver can be operated without operating the first receiver.

On the other hand, if it is desired to operate the first receiver, a signal is transmitted for opening or closing which is about twice in length of similar signals for the second receiver, that is to say, the signal which is transmitted for the receiver 4 lasts for a period of thirteen seconds for an "on" signal or sixteen seconds for an "off" signal.

The purpose of this particular relation between the length of signals or energization of the pilot line outlined hereinabove is so as to cause either the selective operation of the second receiver alone or of the first and second receivers simultaneously. Further, it is to be noted that when either the long or short signal is transmitted that the second receiver will operate for a complete cycle, that is to say, two teeth will pass the cam follower and the receiver will be again placed in the position in which it was prior to the reception of the signal for operating the first receiver.

In greater detail, the immediately preceding facts may be stated by pointing out that when the short signal for the first receiver which lasts for thirteen seconds is received by the second receiver as well as the first receiver, that the second receiver will rotate its cam past two teeth since the total time required for this operation of the second receiver is only twelve seconds. However, it will not rotate it past three teeth of the second receiver for the sum of the time required for any three teeth of the second receiver is more than thirteen seconds. On the other hand, suppose the signal for the first receiver lasted for sixteen seconds. This again would cause the first receiver to rotate its cam past two teeth but not past three teeth since the time required for the rotation of the second receiver past two teeth is less than the sixteen-second signal. Further, it is to be noted that the second receiver cannot rotate past three teeth since the sum of the time required for any three teeth of the second receiver is more than sixteen seconds.

It is apparent from the above, that the selective operation of either the second receiver alone or the simultaneous operation of both receivers may be obtained.

Further it is clear that when the second receiver operates due to a signal intended for the operation of the first receiver, that it will move a complete cycle and the switch will be in the same position where it was at the time such signal was received. The result of this is that if the second receiver had been in the "on" position, it will rotate momentarily past the "off" position and back to the "on" position. Correspondingly, if the second receiver had been in the "off" position it will rotate to the "on" position and then again back to the "off" position. This will do no harm to the controlled loads. For example, if the respective first and second loads are for a street lighting system and for a series of water heaters, respectively, it is clear that the momentary interruption of the energization of water heater loads will do no harm.

Each receiver is so made that if a spurious or a signal less than that required to operate the receiver is received that no faulty operation is occasioned. For example, if a spurious signal is received with the parts in the position shown in Figure 3 and of less duration that that of the desired signal, the parts may move to the position shown in Figure 4. Upon cessation of the spurious signal, the reaction of the cam follower 16 and the cam 14 is such that the parts move back to the position as shown in Figure 5 for instance.

The receivers per se form no part of the present invention. They may be constructed in the manner described in the copending application of Anthony Van Ryan, Serial No. 213,793, filed March 3, 1951, for Remote Controlled Switch, assigned to the same assignee as the present invention.

It will be seen that a simple remote control system has been provided by this invention which is certain in its operation and which is very simple and which may be cheaply installed.

It will be seen further that any suitable type of signal transmitting means or means for energizing the pilot line may be employed as these devices are well known.

Further, if desired, a first and a second receiver may be installed at the transmitting station as indicated by the reference characters $R_1$, $R_2$, such receivers being respectively identically like the first and second receivers hereinabove discussed. These receivers $R_1$ and $R_2$ will act as tell-tale receivers.

Although this invention has been described in considerable detail, it is to be understood that such description is intended as illustrative rather than limiting, as the invention may be variously embodied and is to be interpreted as claimed.

I claim:

1. In a remote control system, a power line, a first and a second load, a first switch means and a second switch means controlling the connecting and disconnecting of said first and second load, respectively, to said power line, a first and a second receiver controlling said first and second switch means and including motor means operatively connected to said first and second switch means, respectively, for operating said switch means, each motor means having closing and opening periods of predetermined lengths, the motor means of said first receiver having each of its respective periods longer than the sum of two periods and less than the sum of three periods of the motor means of said second receiver.

2. In a remote control system, a power line, a first and a second load, a first and a second receiver having switch means respectively controlling the connecting and disconnecting of said first and second loads to said power line and having motor means for operating the respective switch means, said second receiver having predetermined closing and opening periods and said first receiver having closing and opening periods twice as long as the respective periods of said second receiver, a pilot line connecting the motor means of said receivers, and control means for energizing said pilot line for predetermined periods to selectively operate said second receiver or both said receivers simultaneously.

3. In a remote control system, a power line, a first and a second load, a first and a second receiver having switch means respectively controlling the connecting and disconnecting of said first and second loads to said power line and having motor means for operating the respective switch means, said second receiver having different predetermined closing and opening periods and said first receiver having different predetermined closing and opening periods twice as long as the respective periods of said second receiver, a pilot line connecting the motor means of said receivers, and control means for energizing said pilot line for predetermined periods to selectively operate said second receiver or both said receivers simultaneously.

4. In a remote control system, a power line, a first and a second load, a first and a second receiver having switch means respectively controlling the connecting and disconnecting of said first and second loads to said power line and having motor means for operating the respective switch means, said second receiver having different predetermined closing and opening periods and said first receiver having different predetermined closing and opening periods twice as long as the respective periods of said second receiver, a pilot line connecting the motor means of said receivers, and control means for energizing said pilot line for predetermined periods to selectively operate said second receiver or both said receivers simultaneously, the shortest period of said first receiver being at least equal to the sum of both periods of said second receiver.

5. In a remote control system, a power line, a first and a second load, a first and a second receiver having switch means respectively controlling the connecting and disconnecting of said first and second loads to said power line and having motor means for operating the respective switch means, said second receiver having different predetermined closing and opening periods and said first receiver having different predetermined closing and opening periods twice as long as the respective periods of said second receiver, a pilot line connecting the motor means of said receivers, and control means for energizing said pilot line for predetermined periods to selectively operate said second receiver or both said receivers simultaneously, the shortest period of said first receiver being at least equal to the sum of both periods of said second receiver and the longest period of said first receiver being less than the sum of three periods of said second receiver.

6. In a remote control system, a power line, a first and a second load, a first and a second receiver having switch means respectively controlling the connecting and disconnecting of said first and second loads to said power line and having motor means for operating the respective switch means, said second receiver having different predetermined closing and opening periods and said first receiver having different predetermined closing and opening periods twice as long as the respective periods of said second receiver, each of said receivers having biasing means for returning its motor means to its initial starting position for each period when the motor means over-shoots, a pilot line connecting the motor means of said receivers, and control means for energizing the pilot line for predetermined periods slightly greater than the periods of the respective motor means to selectively operate said second receiver or both of said receivers simultaneously.

HECTOR RAWCLIFFE PUTZ.

No references cited.